(12) United States Patent
Riddick

(10) Patent No.: US 9,598,116 B2
(45) Date of Patent: Mar. 21, 2017

(54) RETRACTABLE TANGENTIAL DEBRIS DEFLECTOR FOR VEHICLE OCCUPANT SAFETY

(71) Applicant: Ben Austin Riddick, League City, TX (US)

(72) Inventor: Ben Austin Riddick, League City, TX (US)

(*) Notice: Subject to any disclaimer, the term of this patent is extended or adjusted under 35 U.S.C. 154(b) by 0 days.

(21) Appl. No.: 14/231,890

(22) Filed: Apr. 1, 2014

(65) Prior Publication Data

US 2015/0274214 A1    Oct. 1, 2015

(51) Int. Cl.
*B62D 25/16* (2006.01)
*B62D 25/18* (2006.01)

(52) U.S. Cl.
CPC ......... *B62D 25/182* (2013.01); *Y10T 29/4984* (2015.01)

(58) Field of Classification Search
CPC .... B62D 25/18; B62D 25/182; B62D 25/184; B62D 25/186; B62D 25/188; B62D 25/16; B62D 25/163; B62D 25/166; B62D 25/168; B60R 21/00; B60R 21/08; B60R 19/00; B60R 3/02; B62B 9/16
See application file for complete search history.

(56) References Cited

U.S. PATENT DOCUMENTS

| | | | | |
|---|---|---|---|---|
| 2,450,958 A | * | 10/1948 | Hayes | 280/154 |
| 2,721,760 A | | 10/1955 | Lapham et al. | |
| 3,486,764 A | * | 12/1969 | Beyer et al. | 280/851 |
| 4,062,580 A | * | 12/1977 | West | 293/128 |
| 4,221,412 A | | 9/1980 | Miller | |
| 4,620,713 A | * | 11/1986 | Sakaguchi | 280/152.3 |
| 5,582,431 A | | 12/1996 | Anderson | |
| 5,829,786 A | * | 11/1998 | Dahl | 280/848 |
| 6,007,102 A | | 12/1999 | Helmus | |
| 6,029,999 A | * | 2/2000 | O'Day | 280/851 |
| 6,565,122 B1 | | 5/2003 | Hansen | |
| 7,185,920 B2 | | 3/2007 | Drummond | |
| 7,222,884 B2 | | 5/2007 | Callan et al. | |

(Continued)

FOREIGN PATENT DOCUMENTS

DE    2827845 A1 *    1/1980
DE    10246589 B3 *    1/2004
(Continued)

*Primary Examiner* — J. Allen Shriver, II
*Assistant Examiner* — Steve Clemmons
(74) *Attorney, Agent, or Firm* — Roy Patrick Norris

(57) ABSTRACT

An embodiment of a retractable debris deflector that interrupts the path of road debris thrown up at a tangential angle by a vehicle's rotating wheel. The deflector is conformally shaped to a wheel well cavity and is rotationally attached out of sight within the wheel well cavity at two points on an underside of a vehicle's body panel. The deflector moves along an arched path between a retracted position within the wheel well cavity that is parallel to the wheel's typical direction of rotation and an extended position substantially out from the wheel well cavity that is partially perpendicular to the wheel's direction of rotation. The deflector is releasably latched into place at the desired position and a force applied to the deflector will allow the deflector to be moved along its arched travel path either towards the extended or back to the retracted position.

2 Claims, 2 Drawing Sheets

(56) References Cited

U.S. PATENT DOCUMENTS

Figure 1:
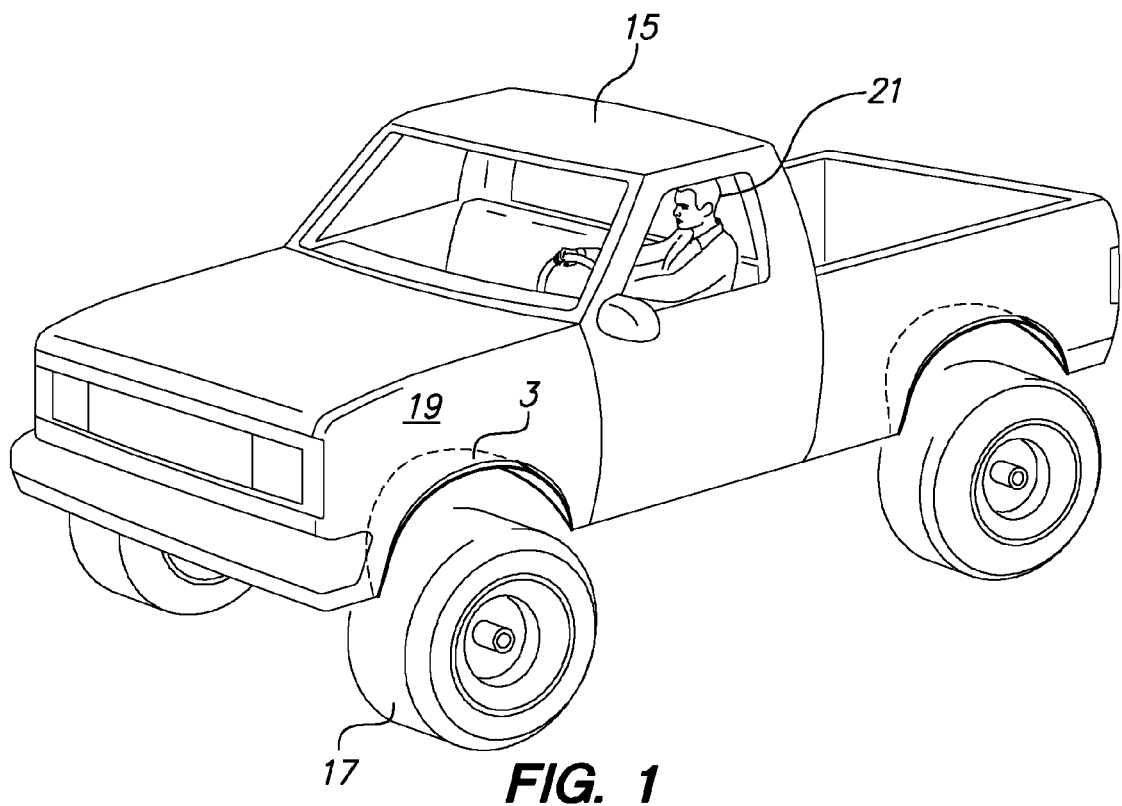

| | | | |
|---|---|---|---|
| 7,845,709 B2* | 12/2010 | Browne et al. | 296/180.5 |
| 8,066,304 B2 | 11/2011 | Ulgen | |
| 8,260,519 B2* | 9/2012 | Canfield | 701/74 |
| 8,523,270 B2* | 9/2013 | Marlier | B62D 25/16 |
| | | | 280/849 |
| 8,979,102 B1* | 3/2015 | Prentice | 280/124.1 |
| 9,162,709 B2* | 10/2015 | Gray | B62D 25/18 |
| 2010/0217490 A1 | 8/2010 | Canfield | |
| 2010/0253034 A1* | 10/2010 | Crismon et al. | 280/154 |
| 2013/0161935 A1* | 6/2013 | Ward et al. | 280/851 |
| 2015/0151794 A1* | 6/2015 | Gray | 280/848 |

FOREIGN PATENT DOCUMENTS

| | | | |
|---|---|---|---|
| DE | 10312089 A1 * | 10/2004 | |
| WO | WO 2007083056 A1 * | 7/2007 | |

* cited by examiner

RETRACTABLE TANGENTIAL DEBRIS DEFLECTOR FOR VEHICLE OCCUPANT SAFETY

CROSS-REFERENCE TO RELATED APPLICATIONS

None.

FEDERALLY SPONSORED RESEARCH

Not applicable.

SEQUENCE LISTING OR PROGRAM

Not applicable.

BACKGROUND

Field of Invention

This invention relates to retractable vehicle debris deflectors that can deflect a rotating wheel's tangentially thrown debris.

Prior Art

Relevant prior art includes:

U.S. Patents

U.S. Pat. No. 2,721,760—Retractable Mud Guard
U.S. Pat. No. 5,582,431—Retractable Mud Flap
U.S. Pat. No. 6,007,102—Adjustable Vehicular Wheel-well Skirts
U.S. Pat. No. 6,565,122B1—Retractable Mud Flap Assembly
U.S. Pat. No. 7,185,920B2—Retractable Wheel and Track Covers
2010/0217490A1—Retractable Wheel Covers
U.S. Pat. No. 8,066,304B2—Retractable Mud Flap for Vehicles

BACKGROUND OF THE INVENTION

On moving vehicles, especially motorized vehicles such as cars and trucks, the mud flaps and vehicle's own body fenders have attempted to serve the purpose of preventing road debris that is caught by the rotating wheel from being thrown up by the wheel and causing inconvenience or harm to the vehicle's occupants. Typically, the vehicle's own body panel located adjacent to the rotating wheel, or a mud flap, prevents a wheel from throwing a piece of road debris straight up from the ground because the debris will directly encounter the body panel itself and be deflected. However, road debris that is thrown up by the rotating wheel at an oblique angle, or tangentially, to the rotating wheel still presents a safety hazard to the vehicle's driver or occupants. This type of road debris can still fly up and around existing protections and strike the vehicle's occupants. Interrupting the trajectory path of tangentially thrown debris trajectory that can harm the vehicle's occupants is therefore necessary. This is typically, but not successfully, accomplished by either an extended body panel fender formed at manufacture of the vehicle, or through an extensive modification of an already built vehicle, or through the use of a mud flap; each implementation attempting to serve as sort of a shield to interrupt the path of the flying debris. However, using these approaches to protect a vehicle's occupants comes at a sacrifice of debris deflection effectiveness, ease of use, and overall aesthetic. A typical approach is the use of excessively large fenders that permanently extend far out from the vehicle's main body and remain extended regardless of whether the need to protect the occupant from road debris is present or not. Another typical approach is to use an overly complex fender or wheel cover system that requires complex actuators or complicated movement arms and demands that the protection system be built into the car's body panel at production, or requires extensive add-on modification of the aftermarket vehicle's body structure. The third typical approach is to use mud flaps or other body structure typically being parallel to and hanging behind or located adjacent to the rotating wheel. But mud flaps merely protect the vehicle's body itself or any persons or things following the vehicle from flying debris thrown straight up by the rotating wheel, and are not designed to protect the vehicle's own driver or occupants from debris tangentially thrown up and around the mud flap. Finally, these existing approaches also have a cosmetic problem as most drivers do not like the physical aesthetic of having large fenders or mud flaps visible on their vehicle.

DRAWINGS

Figures

FIG. 1—A perspective view of a Retractable Tangential Debris Deflector with the deflector in its first retracted position.

Figure 2:
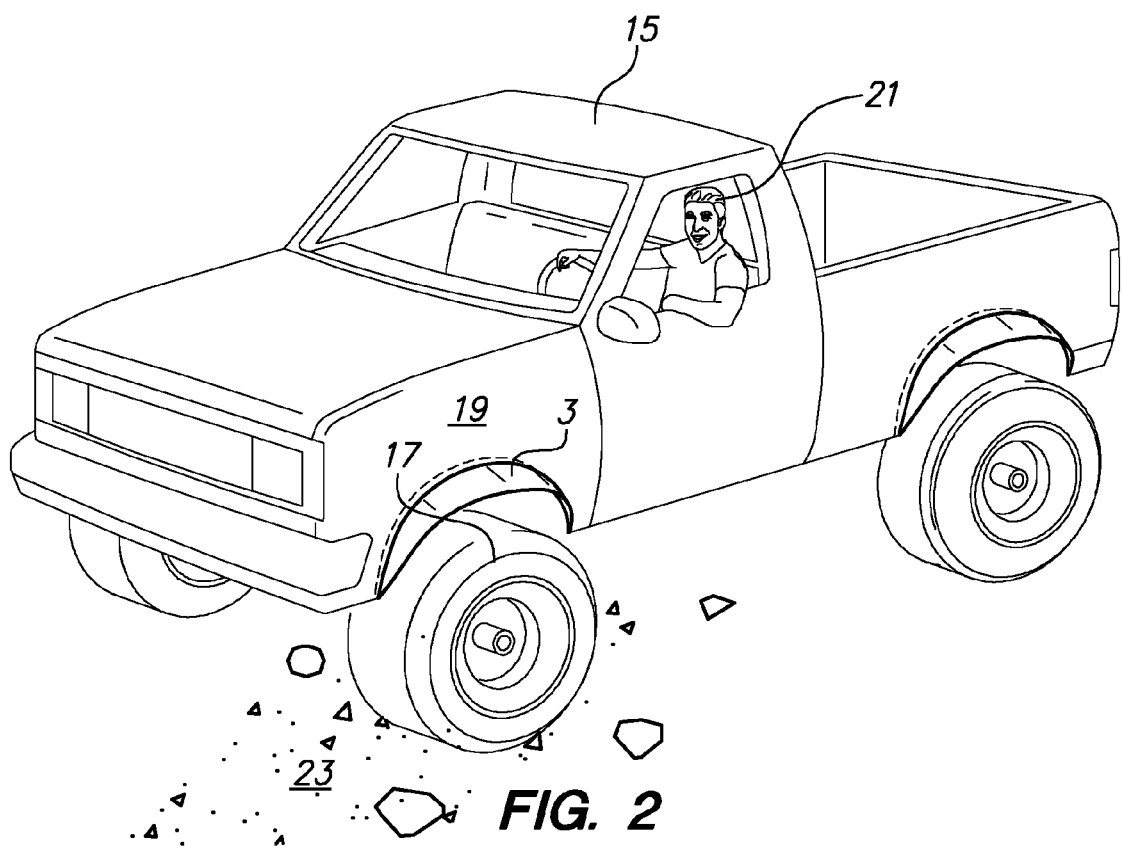

FIG. 2—A perspective view of a Retractable Tangential Debris Deflector with the deflector in its second extended position.

Figure 3:
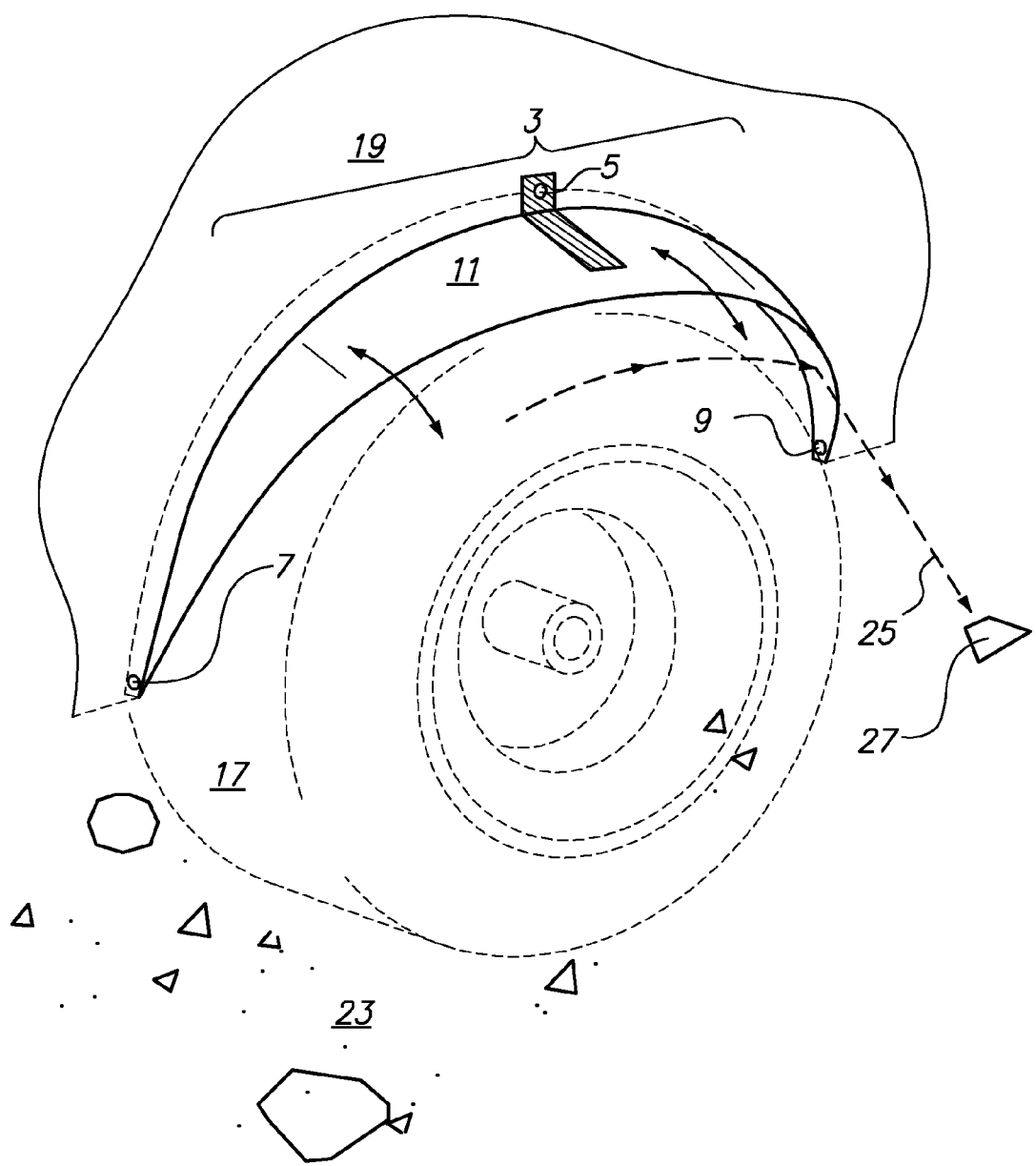

FIG. 3—A magnified perspective view of a Retractable Tangential Debris Deflector with the deflector in its second extended position, in use and latched.

DRAWINGS

List of Reference Numerals

3—deflector piece
5—latching means
7—front end pivotal attachment point
9—back end pivotal attachment point
11—top surface deflector piece exposed to view
15—vehicle
17—rotating wheel
19—vehicle body panel
21—vehicle occupant
23—road debris field
25—deflection path
27—piece of tangentially thrown road debris

DETAILED DESCRIPTION

As shown in FIGS. 1 and 2, a vehicle 15 has a vehicle body panel 19 located near a rotating wheel 17. When the vehicle 15 is going in a straight line motion, the rotating wheel has a similar rotating direction, and the rotating wheel has a horizontal axis about which the wheel rotates, and a vertical axis that is perpendicular to the wheel's rotating direction. The vehicle 15 is shown an example only and is not a limitation to the types of vehicles. The body panel 19 of the vehicle 15 has an underside section that creates a wheel well cavity located adjacent to the rotating wheel 17 where the rotating wheel 17 rotates. As shown in FIGS. 1, 2 and 3, an embodiment of a Retractable Tangential Debris Deflector comprises a deflector piece 3 composed of a rigidly flexible material that is formed to a shape that is substantially similar to the underside section of the body panel 19. In an alternative embodiment not shown, the deflector piece 3 is composed of a rigidly flexible material that is formed into a neutral shape that is conformable to the underside section of body panel 19 for a variety of different vehicles. As shown in FIG. 1, the deflector piece 3 has a top surface 11 that faces the underside section of the body panel 19, a bottom surface that faces the rotating wheel 17, an inner edge that faces the wheel well cavity, and an outer edge that faces outward from the wheel well cavity. As shown in FIG. 3, the deflector piece 3 also has a front end pivotal attachment point 7 and a back end pivotal attachment point 9. The deflector piece 3 is rotationally attached to the underside section of the body panel 19 at the front end pivotal attachment point 7 and at the back end pivotal attachment point 9 such that the deflector piece 3 can rotationally move along an arched path of travel. The deflector piece 3 moves along the arched path of travel between a first refracted position as shown in FIG. 1 that is located substantially within said wheel well cavity with a first angle of incidence that is substantially low between the deflector piece 3 and the vertical axes of the rotating wheel, and a second extended position as shown in FIG. 2 that is substantially located outside the wheel well cavity with a second angle of incidence between the deflector piece 3 and the vertical axis of the rotating wheel that is substantially higher. When the deflector piece 3 is in the first retracted position as shown in FIG. 1, it is substantially hidden within the wheel well cavity and out of view from a casual observer who is looking at the vehicle 15. FIG. 3 shows a road debris field 23 that the rotating wheel 17 will encounter. The arched path of travel that deflector piece 3 moves along is sufficiently long enough such that a piece of tangentially thrown road debris 27 that would normally be tangentially thrown up by the rotating wheel 17 to a vehicle occupant 21 is instead safely deflected along a deflection path 25 and away from the vehicle occupant 21. The width of the deflector piece 3 at its widest point is such that when the deflector piece 3 is extended to its second extended position along the arched path of travel as shown in FIG. 3, it will block the tangentially thrown road debris 27 from reaching the vehicle occupant 21.

A latching means 5 is located adjacent to the wheel well cavity and is in physical contact with the deflector piece 3 and the body panel 19. The latching means 5 releasably latches the deflector piece 3 into a desired position along the arched path of travel. When unlatched, the latching means 5 allows the deflector piece 3 to move along its arched path of travel. When latched, the latching means 5 resists the motion of deflector piece 3 moving along the arched path of travel. The latching means 5 is also configured to not resist the motion of deflector piece 3 moving along the arched path of travel towards the first retracted position when an impact force is applied in an inwardly direction towards the wheel well cavity in proximity of the outer edge of the deflector piece 3. The impact force is a force that is applied to the deflector piece 3 in the inwardly direction towards the wheel well cavity that is of a strength that would be sufficient to otherwise damage deflector piece 3 if deflector piece 3 did not retract. The latching means 5 is a latching mechanism attached to the deflector piece 3 and is configured to be in resistive contact with the body panel 19 in order to releasably latch the deflector piece 3 along the arched path of travel.

In another embodiment, the latching means 5 is a latching mechanism formed as part of the top surface 11 of deflector piece 3 and is configured to be in resistive contact with the body panel 19 in order to releasably latch the deflector piece 3 along the arched path of travel.

In another embodiment, the latching means 5 is a latching mechanism attached to the body panel 19 and is configured to be in resistive contact with the deflector piece 3 in order to releasably latch the deflector piece 3 along the arched path of travel.

In another embodiment that is not shown, the latching means 5 is a user controlled actuator that is coupled to the body panel 19 and to the deflector piece 3 and is configured to provide an outwardly directed mechanical force and an inwardly directed mechanical force to move the deflector piece 3 along the arched path between the first retracted position and the second extended position. When not moving along the arched path of travel, the user controlled actuator latches the deflector piece 3 along the arched path of travel.

Operation:

As shown in FIGS. 1-3, in operation, the vehicle occupant 21, when encountering the road debris field 23, can extend the deflector piece 3 from the first retracted position within said wheel well cavity as shown in FIG. 1 to the second extended position as shown in FIG. 2 along the arched path of travel. This is accomplished by applying an outward force element to the deflector piece 3 in an outwardly direction that is directed away from the wheel well cavity. The deflector piece 3 will then be held into the desired position by the latching means 5. The outward force element is an outwardly directed manual force applied to the deflector piece 3 at the proximity of the outer edge of the deflector piece 3. The vehicle occupant 21 can then safely continue travel. When the road debris field 23 is exited, the vehicle occupant 21 may retract the deflector piece 3 and make it hidden from view, by moving deflector piece 3 from the second extended position back towards the first retracted position within said wheel well cavity as shown in FIG. 1. This is accomplished by applying an inward force element to the deflector piece 3 in an inwardly direction towards the wheel well cavity that moves the deflector piece 3 along the arched path to the first refracted position. The inward force element is an inwardly directed manual force applied to the deflector piece 3 at the proximity of the outer edge of the deflector piece 3. Further, the deflector piece 3 rotationally moves autonomously along the arched path of travel towards the first retracted position when the impact force element is applied to the deflector piece 3 in the inwardly direction towards the wheel well cavity. This is useful for when the vehicle 15 accidentally brushes up against a trunk of a tree or another object. The impact force is the force inwardly directed towards the wheel well cavity to the deflector piece 3 that results from contact with the tree or the object that is of such strength that it would otherwise damage the deflector piece 3. In such an instance, in the presence of the impact force, the latching means 5 would autonomously allow the deflector piece 3 to travel along the arched path of travel towards the first retracted position.

In an alternative embodiment, the outward force element used to move the deflector piece 3 along the arched path outwards towards the second extended position is the outwardly directed mechanical force applied to the deflector piece 3 sourced from the user controlled actuator coupled to the body panel 19 and to the deflector piece 3.

In an alternative embodiment not shown, the inward force element used to move the deflector piece 3 along the arched path inwards towards the wheel well cavity is an inwardly directed mechanical force applied to the deflector piece 3 sourced from the user controlled actuator coupled to the body panel 19 and the deflector piece 3.

Advantages:

The present embodiment may have one or more of the following advantages:

One advantage of the embodiments is the deflector piece 3 can be positioned and remain latched at any point along its arched path of travel.

Another advantage of the embodiments is that deflector piece 3 can autonomously retract when the impact force is applied to the deflector piece 3 in the direction of the wheel well cavity that would otherwise damage deflector piece 3 if it did not retract.

Another advantage of the embodiment is that deflector piece 3 is hidden from view when it is first refracted position.

Another advantage of the embodiment is that the deflector piece 3 is easily rotationally attached to the underside of vehicle body panel 19 at two locations.

Another advantage of the embodiment is that the deflector piece 3 is conformable to a standard set of vehicles for ease of installation to the same style vehicle body panel 19.

Another advantage of the embodiment is that the deflector piece 3 can be formed into the neutral shape that is conformable to the multitude of different shapes of different styles of vehicle body panel 19.

I claim:

1. A retractable tangential debris deflector to deflect a piece of road debris that is tangentially flying from a rotating wheel of a vehicle and ready to strike a vehicle occupant, said vehicle having a body panel located near to said rotating wheel, said body panel having an underside section that creates a wheel well cavity located adjacent to said rotating wheel, said vehicle going in a straight line motion with said rotating wheel having a horizontal axis about which said wheel rotates, and said rotating wheel having a vertical axis that is perpendicular to said horizontal axis, comprising a rigidly flexible deflector piece that is conformable in shape to said underside section of said body panel, said deflector piece has a top surface that faces said underside portion of said body panel and a bottom surface that faces said rotating wheel and an inner edge that faces said wheel well cavity and an outer edge that faces outward from said wheel well cavity, wherein said deflector piece is rotationally attached to said underside section of said body panel so that said deflector piece can rotationally move along an arched path of travel between a first retracted position that is substantially located within said wheel well cavity with a first angle of incidence between said deflector piece and said vertical axis of said rotating wheel that is substantially low, and a second extended position that is substantially located outside said wheel well cavity with a second angle of incidence between said deflector piece and said vertical axis of said rotating wheel that is substantially higher, wherein said deflector piece has a front end and a back end, said deflector piece is rotationally attached to said underside section of said body panel at a front end pivotal attachment point located near said front end of said deflector piece and at a back end pivotal attachment point located near said back end of said deflector piece.

2. A retractable tangential debris deflector to deflect a piece of road debris that is tangentially flying from a rotating wheel of a vehicle and ready to strike a vehicle occupant, said vehicle having a body panel located near to said rotating wheel, said body panel having an underside section that creates a wheel well cavity located adjacent to said rotating wheel, said vehicle going in a straight line motion with said rotating wheel having a horizontal axis about which said wheel rotates, and said rotating wheel having a vertical axis that is perpendicular to said horizontal axis, comprising a rigidly flexible deflector piece that is conformable in shape to said underside section of said body panel, said deflector piece has a top surface that faces said underside portion of said body panel and a bottom surface that faces said rotating wheel and an inner edge that faces said wheel well cavity and an outer edge that faces outward from said wheel well cavity, wherein said deflector piece is rotationally attached to said underside section of said body panel so that said deflector piece can rotationally move along an arched path of travel between a first retracted position that is substantially located within said wheel well cavity with a first angle of incidence between said deflector piece and said vertical axis of said rotating wheel that is substantially low, and a second extended position that is substantially located outside said wheel well cavity with a second angle of incidence between said deflector piece and said vertical axis of said rotating wheel that is substantially higher, wherein said deflector piece has a front end and a back end, said deflector piece is rotationally attached to said underside section of said body panel at a front end pivotal attachment point located near said front end of said deflector piece and at a back end pivotal attachment point located near said back end of said deflector piece.

\* \* \* \* \*